US011231733B2

(12) United States Patent
Veda et al.

(10) Patent No.: US 11,231,733 B2
(45) Date of Patent: *Jan. 25, 2022

(54) SYSTEM AND METHOD OF POWER CONTROL FOR AN ENERGY STORAGE CHARGING STATION

(71) Applicant: Westinghouse Air Brake Technologies Corporation, Pittsburgh, PA (US)

(72) Inventors: Santosh Sambamoorthy Veda, Niskayuna, NY (US); Robert Dean King, Schenectady, NY (US); Irene Michelle Berry, Niskayuna, NY (US); Zhi Zhou, Bethlehem, NY (US); Matthew Christian Nielsen, Niskayuna, NY (US); Lembit Salasoo, Niskayuna, NY (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/452,102

(22) Filed: Jun. 25, 2019

(65) Prior Publication Data

US 2019/0317539 A1    Oct. 17, 2019

Related U.S. Application Data

(63) Continuation of application No. 15/319,501, filed as application No. PCT/US2015/036940 on Jun. 22, 2015, now Pat. No. 10,520,966.

(Continued)

(51) Int. Cl.
*G05F 1/66* (2006.01)
*G06F 1/26* (2006.01)
(Continued)

(52) U.S. Cl.
CPC ............. *G05F 1/66* (2013.01); *G05F 1/70* (2013.01); *G06F 1/26* (2013.01); *G06Q 50/06* (2013.01);
(Continued)

(58) Field of Classification Search
CPC ............. Y02T 10/7005; Y02T 10/7088; Y02T 90/128; Y02T 90/14; Y02T 90/163;
(Continued)

(56) References Cited

U.S. PATENT DOCUMENTS 8,154,246 B1 * 4/2012 Heitmann .......... G06Q 30/0283
320/109
9,026,347 B2 * 5/2015 Gadh ................. G01R 31/3842
701/123

(Continued)

FOREIGN PATENT DOCUMENTS

EP    1410655 A2    4/2004
GB    201007246    *  6/2010    ............. B60L 58/10
(Continued)

OTHER PUBLICATIONS

"Notification of Reasons for Refusal" dated Apr. 16, 2019 for corresponding JP Patent Application No. 2016-571373.
(Continued)

*Primary Examiner* — Crystal J Barnes-Bullock
(74) *Attorney, Agent, or Firm* — Christopher R. Carroll; The Small Patent Law Group LLC

(57) ABSTRACT

A system includes a control unit having one or more processors and a communication interface. The communication interface is configured to communicate with one or more charging stations that are electrically coupled to receive electrical power from a power distribution grid and that are configured to selectively charge one or more energy storage devices connected to the charging stations. The one (Continued)

or more processors are configured to generate first control signals for communication by the communication interface to the one or more charging stations to control transfer of reactive and/or active power from the charging stations to the power distribution grid. The control signals are generated based at least in part on a load cycle profile of one or more electric machines electrically coupled to the power distribution grid.

18 Claims, 5 Drawing Sheets

Related U.S. Application Data

(60) Provisional application No. 62/014,807, filed on Jun. 20, 2014, provisional application No. 62/014,793, filed on Jun. 20, 2014.

(51) Int. Cl.
    *H02J 3/00*     (2006.01)
    *G05F 1/70*     (2006.01)
    *G06Q 50/06*     (2012.01)
    *H02J 3/38*     (2006.01)
    *H02J 3/32*     (2006.01)
    *H02J 13/00*     (2006.01)
    *H02J 3/14*     (2006.01)
    *H02J 3/16*     (2006.01)
    *H02J 7/00*     (2006.01)

(52) U.S. Cl.
    CPC ............... *H02J 3/008* (2013.01); *H02J 3/14* (2013.01); *H02J 3/16* (2013.01); *H02J 3/32* (2013.01); *H02J 3/382* (2013.01); *H02J 7/0021* (2013.01); *H02J 13/0006* (2013.01); *H02J 13/0062* (2013.01); *H02J 3/003* (2020.01); *Y02B 70/30* (2013.01); *Y02B 90/20* (2013.01); *Y02E 40/70* (2013.01); *Y02E 60/00* (2013.01); *Y02P 80/10* (2015.11); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/123* (2013.01); *Y04S 10/50* (2013.01); *Y04S 20/12* (2013.01); *Y04S 20/221* (2013.01); *Y04S 30/12* (2013.01); *Y04S 50/10* (2013.01)

(58) Field of Classification Search
    CPC ........ Y02T 90/168; Y02P 80/11; Y02E 40/42; Y02E 60/721; Y02B 70/3225; Y02B 90/222; Y04S 10/123; Y04S 10/126; Y04S 10/54; Y04S 20/12; Y04S 20/222; Y04S 30/12; Y04S 50/10; H02J 3/008; H02J 3/32; H02J 3/382; G06Q 50/06; G06F 1/26; G05F 1/66; G05B 15/02; G01R 31/3624; B60L 11/1824; B60L 11/1838; B60L 11/184; B60L 11/1842; B60L 11/1844; B60L 2230/16; B60L 2230/30; B60L 2240/72
    See application file for complete search history.

(56) References Cited

U.S. PATENT DOCUMENTS

| | | | |
|---|---|---|---|
| 9,071,082 B2 * | 6/2015 | Nishibayashi | B60L 58/16 |
| 9,348,381 B2 * | 5/2016 | Khoo | B60L 53/63 |
| 9,368,970 B2 * | 6/2016 | Nishibayashi | B60L 53/68 |
| 10,520,966 B2 * | 12/2019 | Veda | H02J 3/008 |
| 10,693,294 B2 * | 6/2020 | Kearns | H02J 3/00 |
| 11,034,255 B2 * | 6/2021 | Ben David | H02J 7/02 |
| 2010/0079004 A1 * | 4/2010 | Keefe | B60L 53/65 307/80 |
| 2010/0082464 A1 * | 4/2010 | Keefe | G06Q 10/06 705/32 |
| 2010/0109445 A1 * | 5/2010 | Kurs | H02J 50/12 307/104 |
| 2012/0086220 A1 | 4/2012 | Abdel-Baqi et al. | |
| 2013/0110296 A1 * | 5/2013 | Khoo | B60L 53/14 700/286 |
| 2013/0179061 A1 * | 7/2013 | Gadh | B60L 53/63 701/123 |
| 2014/0012446 A1 | 1/2014 | Kumar et al. | |
| 2015/0069970 A1 * | 3/2015 | Sarkar | B60L 53/305 320/109 |
| 2015/0301546 A1 * | 10/2015 | Hornor | G05F 1/66 700/295 |
| 2015/0355284 A1 * | 12/2015 | Prada | G05B 13/042 700/297 |
| 2018/0018007 A1 * | 1/2018 | Dorn | G06F 1/26 |
| 2021/0203177 A1 * | 7/2021 | Peng | B60L 53/63 |
| 2021/0218249 A1 * | 7/2021 | Dong | H02J 1/102 |

FOREIGN PATENT DOCUMENTS

| | | | |
|---|---|---|---|
| JP | H0282595 | A | 3/1990 |
| JP | 2006109621 | A | 4/2006 |
| JP | 2010246368 | A | 10/2010 |
| JP | 2012154024 | A | 8/2012 |
| JP | 2012175722 | A | 9/2012 |
| JP | 2012249505 | A | 12/2012 |
| JP | 2013099140 | A | 5/2013 |
| JP | 2013515888 | A | 5/2013 |
| JP | 2013172488 | A | 9/2013 |
| JP | 5396549 | B1 | 1/2014 |
| WO | 2010143628 | A1 | 12/2010 |
| WO | 2014083239 | A1 | 6/2014 |

OTHER PUBLICATIONS

English translation of the "Notification of Reasons for Refusal" dated Apr. 16, 2019 for corresponding JP Patent Application No. 2016-571373.
ISR/WO of International Publication No. WO2012/119300 (Chinese Application No. CN2011071567).
ISR/WO of International Publication No. 2013-515888.

* cited by examiner

SYSTEM AND METHOD OF POWER CONTROL FOR AN ENERGY STORAGE CHARGING STATION

CROSS-REFERENCE TO RELATED APPLICATIONS

This application is a continuation of Ser. No. 15/319,501, filed 16 Dec. 2016, which is a national stage application under 35 U.S.C. § 371(c) of prior filed PCT application serial number PCT/US2015/036940, filed 22 Jun. 2015, which claims the benefit of U.S. Provisional Application Ser. No. 62/014,807, filed 20 Jun. 2014, and U.S. Provisional Application Ser. No. 62/014,793, filed 20 Jun. 2014. The above-listed applications are incorporated herein by reference in their entireties.

FIELD

Embodiments of the invention relate generally to the charging of electric vehicles. Other embodiments relate to control systems for power distribution grids, especially local power distribution grids such as in a mine or manufacturing facility.

BACKGROUND

Electric vehicles typically use one or more traction motors for propulsion. In some such vehicles, electrical energy is stored in on-board energy storage devices, such as batteries and ultra-capacitors, and fed to an inverter where direct current (DC) power is converted to alternating current (AC) power. The AC is then fed to multi-phase (typically 3-phase) AC motors that drive the wheels of the vehicle. Electric propulsion is becoming increasingly common in material transport vehicles, including underground mining vehicles, replacing diesel powered vehicles in the interest of complying with environmental and safety regulations, lowering emissions, and improving mine air conditions.

Electric vehicles, however, require periodic charging of the on-board energy storage devices. While some electric vehicles utilize removable battery packs that are swapped out when they reach a low state of charge, other electric vehicles have energy storage devices that are permanently affixed to the vehicle, and which require a connection to a supply of electrical power for recharging. In either case, in a mine or other industrial facility, it may be impractical to move the vehicle and/or energy storage device outside the facility for charging. Therefore, the facility may be outfitted with charging stations, which are connected to the power distribution system of the facility for receiving a supply of electrical power for charging electric vehicle energy storage devices.

Operations in mine and other industrial facilities present unique challenges from a power supply standpoint. Mines, for example, are typically outfitted with a local power distribution system that is connected to the public utility grid and/or local power generating equipment. The local power distribution system provides power for lighting, ventilation equipment, mining equipment and machinery, and the like. For example, the power distribution system may be used to supply power to dragline excavators, power shovels (e.g., electric mining shovels), continuous miners, and other machinery or electrical devices, which are known to present large electrical loads.

Indeed, with many of the loads on the distribution system being large motor loads, there are often large inrush currents during startup. In addition to large load swings, these loads can create large step changes when they are turned off or on. When the local power distribution system is weak, such as when the is connected to the main grid by long transmission lines or is part of a microgrid, the ability of the local system to manage these large load steps within the required time is significantly lesser, leading to grid instability. Even in strongly connected grids, such large load swings are unfavorable for normal grid operation and could lead to nuisance tripping of protective devices and excessive wear and tear on electrical equipment.

Moreover, in connection with power distribution to mining machinery, reactive power is needed within the mine at the site of such mining equipment and machinery. The frequent intermittent operation of the machinery's large electric motors, however, may cause voltage drops across the long feeder cables between the electrical substations (that form a part of the local distribution system) and the machinery. Accordingly, maintaining adequate voltage is one of the more challenging problems in the mining industry, and is oftentimes the primary constraint on mine expansion from the point of power delivery to the mining operation. This is due to the fact that both motor productivity and life decrease with decreasing voltage. In certain cases, maintaining minimum acceptable voltage sets determines the maximum allowable cable length and, as a result, the maximum physical extent of the mine.

BRIEF DESCRIPTION

In an embodiment, a system (e.g., power control system) includes a control unit having a processor and a communication interface operably coupled to the processor. The communication interface is configured to communicate with one or more charging stations that are electrically coupled to receive electrical power from a power distribution grid and that are configured to selectively charge one or more energy storage devices connected to the charging stations. For example, the charging stations may be electric vehicle charging stations, and the energy storage devices may be electric vehicle batteries. The processor of the control unit is configured to generate first control signals for communication by the communication interface to the one or more charging stations to control transfer of reactive and/or active power from the charging stations to the power distribution grid. The control signals are generated based at least in part on a load cycle profile of one or more electric machines (e.g., loads other than the charging stations) electrically coupled to the power distribution grid. The load cycle profile may include information of one or more times (e.g., time periods, or time of day) when the electric machines are scheduled to draw electrical power from the power distribution grid, and the expected or designated magnitude(s) of the electrical power to be drawn at those times. Alternatively or additionally, the load cycle profile may include information of how much power the one or more electric machines are expected to draw from the power distribution grid when the one or more electric machines are operational.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
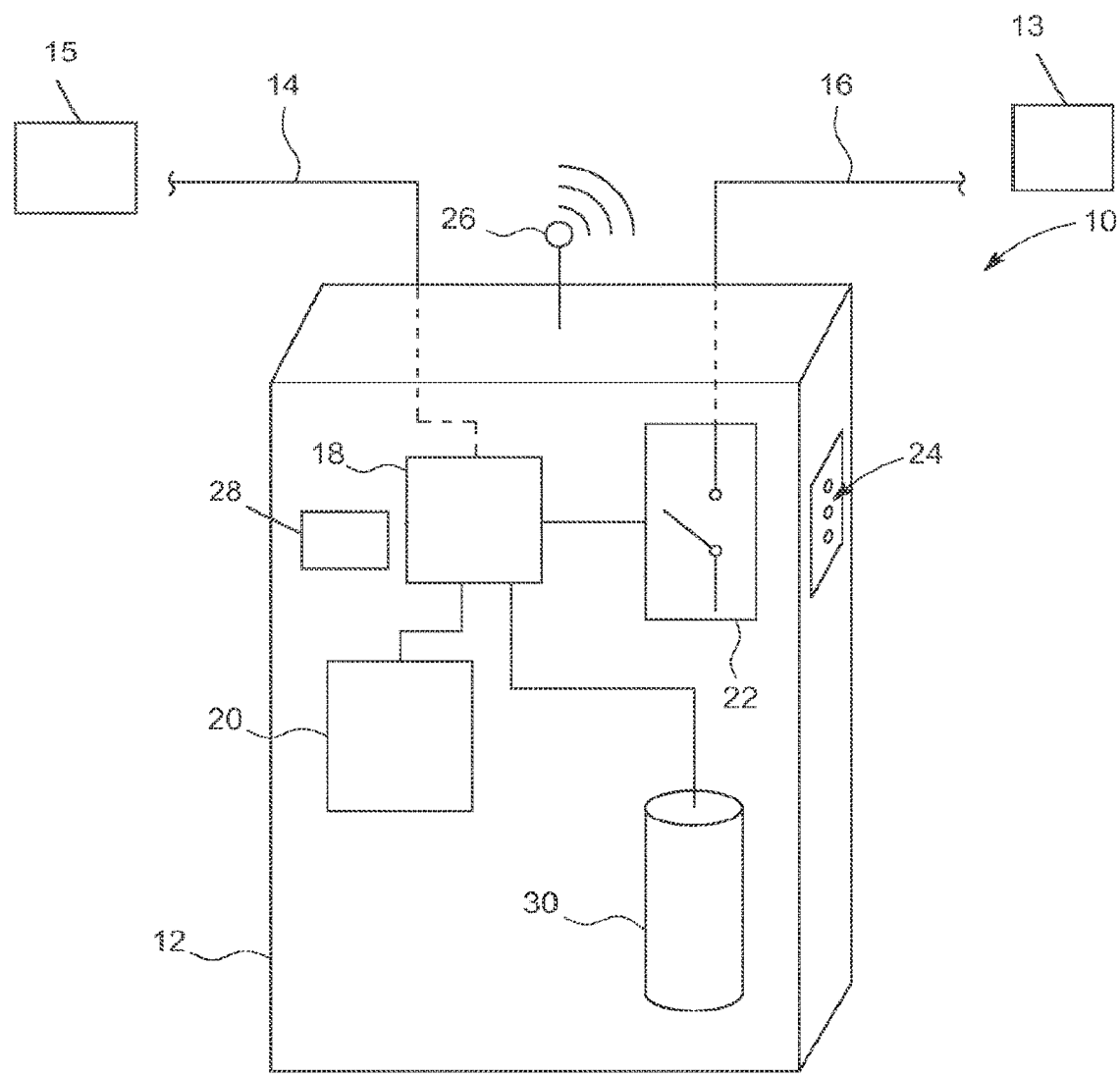
FIG. 1 is schematic illustration and block diagram of a charging station, according to an embodiment of the invention.

Reference will be made below in detail to exemplary embodiments of the invention, examples of which are illustrated in the accompanying drawings. Wherever possible, the same reference numerals used throughout the drawings refer to the same or like parts. While aspects of the invention are described and illustrated in connection with material transport vehicles (e.g., underground or above ground mining vehicles), embodiments are applicable to electric vehicles and other electrical machinery more generally. In addition, while embodiments are described and illustrated herein in connection with a power distribution system within a mine or other industrial facility, other embodiments are applicable to any type of electrical grid or microgrid, generally.

As used herein, "electrically connected," "electrical communication," and "electrically coupled" mean that the referenced elements are directly or indirectly connected such that an electrical current or power may flow from one to the other. The connection may include a direct conductive connection (without an intervening capacitive, inductive, or active element), an inductive connection, a capacitive connection, and/or any other suitable electrical connection. Intervening components may be present. As also used herein, "electric machine" means a machine that is electrically powered. A "discrete" electric machine is one that is individually separate and distinct, e.g., it may be moveable from one location to another as a single unit and/or connectable to a power distribution grid via one connection. (From the perspective of a power distribution grid, the power draw of a discrete electric machine is the power drawn from the grid, or fed back to the grid, by that one machine, as opposed to a lumped or cumulative power draw of plural electric machines attached, for example, at different points to the grid.) Examples of such discrete electric machines include, but are not limited to, dragline excavators, power shovels (e.g., electric mining shovels), and continuous miners. "Electric vehicle" includes vehicles that run on stored electrical power only (no onboard engine) and hybrid vehicles that run on stored electrical power and additionally include an on-board engine for battery charging, directly powering motors, or the like.

Embodiments of the invention relate to power control systems for charging stations coupled to a local power distribution grid, such as in a mine or other industrial facility, for providing grid support. In one example, a system includes a control unit having a processor and a communication interface operably coupled to the processor. The communication interface is configured to communicate with one or more charging stations that are electrically coupled to receive electrical power from a power distribution grid. The control unit may be part of one of the charging stations (e.g., housed in a housing of the charging station), or it may be a centralized unit apart from any of the charging stations. The charging stations are configured to selectively charge one or more energy storage devices connected to the charging stations. ('electively' means controllably at different times, such that there may be instances where an energy storage device is electrically coupled to a charging station but is not being charged.) The charging stations may be electric vehicle charging stations, and the energy storage devices may be electric vehicle batteries. The processor of the control unit is configured to generate first control signals for communication by the communication interface to the one or more charging stations to control transfer of reactive and/or active power from the charging stations to the power distribution grid. (In an embodiment, only reactive power is controlled. In another embodiment, only active power is controlled. In another embodiment, both are controlled.) The control signals are generated based at least in part on a load cycle profile of one or more electric machines (e.g., loads other than the charging stations) electrically coupled to the power distribution grid. The load cycle profile may include information of one or more times (e.g., time periods, or time of day) when the electric machines are scheduled to draw electrical power from the power distribution grid, and the expected or designated magnitude(s) of the electrical power to be drawn at those times. Alternatively or additionally, the load cycle profile may include information of how much power the one or more electric machines are expected to draw from the power distribution grid when the one or more electric machines are operational. That is, even if a machine has an unknown or random duty cycle, the control unit will know from the load cycle profile how much power is expected to be drawn when the machine is operational (i.e., expected power draw as a function of operating time), allowing the control unit to react accordingly responsive to detecting that the machine has become or will become operational, or receiving information (e.g., from a sensor) of the same.

In this manner, according to aspects of the invention, the control unit is configured to control the charging stations to be available to transfer power (e.g., from electric vehicle energy storage devices connected to the charging stations) to the power distribution grid at times of expected high loads and/or load transients. This may be especially useful for stabilizing local power distribution grids (such as in a mine or other industrial facility) that support a relatively small number of large power draw (e.g., 1 to 10 megawatts each) loads.

FIG. 1 shows an electric vehicle charging station 10, according to an embodiment of the invention. The charging station 10 includes a housing 12, which may be generally rectangular or otherwise. The housing 12 may be made of steel or another metal, although any other robust structure may be utilized to house the internal components of the charging station, as discussed in detail hereafter. In an embodiment, the housing 12 is an explosion-proof enclosure, meaning it meets the explosion-proof enclosure standards of the International Electrotechnical Commission (IEC) and/or the U.S. Department of Labor Mine Safety and Health Administration (MSHA). The station 10 is electrically connected to a supply of AC power by supply line 14, and includes a charge line 16 for connection to an electric vehicle 13 to recharge the same. In an embodiment, the supply line 14 connects the station 10 to a power distribution grid 15 (i.e., a power distribution system or network), within a mine or otherwise, which may be, in turn, connected to the main power grid and/or local power generating equipment. In an embodiment, the charge line 16 is a conductive cable capable of transmitting electrical power from the charging station 10 to a coupled electric vehicle or other equipment. In other embodiments, the charge line 16 may be replaced by a wireless means of transferring AC power to the electric vehicle, such as that known in the art.

With further reference to FIG. 1, the electric vehicle charging station 10 also includes a variety of system blocks for electrical safety, communications, controls, and the like. As used herein, "block" refers to specific component(s) and/or device(s) configured to perform indicated functions. In particular, the charging station includes a control block 18, a communications block 20, an electrical switch 22, a display 24, and a network communications device 26. The charging station may also include a control unit 28. In an embodiment, the control unit 28 is part of the control block 18. Alternatively or additionally, the control unit 28 can encompass and/or be comprised of other parts of the charging station. The control unit 28 is configured to control distribution of electrical energy from the charging station 10 to a connected electric vehicle (or other equipment) and/or the transfer of electrical energy, such as stored in an energy storage device of a connected electric vehicle, back to the power distribution grid, as discussed in detail herein. The control block 18 may be configured to protect the charging station 10 and the connected vehicle(s) from electrical damage. For this purpose, the control block 18 may also include a control board having an array of circuit breakers, fuses, and/or other components for ground fault protection and overload protection monitoring.

In an embodiment, the communications block 20 is configured to establish a communications link with the electric vehicle to be charged. The purpose of such communications link is to provide a high bandwidth link to the vehicle in order to exchange information, critical or otherwise. In an embodiment, the communication between the communications block 20 and the vehicle 13 is a wired connection, although other types of communication such as wireless are also envisioned. Critical information may include health monitoring data, uploads of critical system software/firmware, and/or logistics information related to vehicle performance within a mine or otherwise. The communications link of the communications block 20 is also utilized to identify the presence of the appropriate vehicle or equipment and to assess the maximum current draw that can be provided through the charging station 10 to the coupled vehicle (or from the vehicle to the charging station) at the time.

The electrical switch 22 is responsible for the basic on and off switching of the AC power to or from the electric vehicle. In particular, the switch can be selectively transitioned from a first state, in which AC electrical power is prevented from flowing from the charging station 10 to a connected electric vehicle, and a second state, in which AC electrical power is permitted to flow from the charging station 10 to a connected electric vehicle to charge the energy storage device on board the vehicle. In an embodiment, the electrical switch 22 is a contactor. In an embodiment, the electrical switch 22 is configured to automatically transition to the second state when an electrical communication between the charging station 10 and a vehicle is established. In other embodiments, the electrical switch may be manually activated.

The display 24 includes one or more electrically-controlled visual indicators, such as a display screen, an LED array, and/or the like. The display is configured to convey operating information (e.g., charging status) to a user. For example, the display 24 may be configured to convey whether or not the station 10 is functioning properly or is in a fault state, and whether or not vehicle charging is complete or ongoing.

The network communications device 26 is configured to provide a communications pathway from the station 10 to another location, such as from a mine or other industrial facility in which the station is disposed to outside the facility, or to another location in the mine or other facility. For example, the communications device 26 may be a wireless transceiver capable of transmitting and/or receiving information over VHF or UHF (for existing leaky feeder systems). In other embodiments, the network communications device 26 provides for communication between the charging station 10 and a remote location over WiFi.

The control unit 28 is configured to control the distribution of electrical energy from the charging station 10 to a connected electric vehicle or equipment. Accordingly, in an embodiment, the control unit 18 may operate according to a control algorithm stored in memory, and in dependence upon information about the vehicle or equipment received from the communications block, to execute a charge routine specific to the vehicle or energy storage units to be charged. Moreover, the control unit 28 may be configured to respond to SCADA commands to throttle charging or pause/suspend charging.

With further reference to FIG. 1, the charging station 10 may also include an on-board energy storage device 30. The on-board energy storage device 30 can be any one or more of a multitude of known energy storage systems, such as batteries, ultracapacitors, and the like, and may be charged using the supply of electrical power received by the station 10 via supply line 14. The energy storage device 30 is configured to release stored electrical energy to a connected vehicle or equipment under control of the control unit 28 to supplement the primary supply of electrical energy coming from the main supply line 14. Accordingly, the energy storage device 30 is configured to function as a buffer to reduce the overall peak load that would otherwise be placed on the power distribution grid 15.

Figure 2:
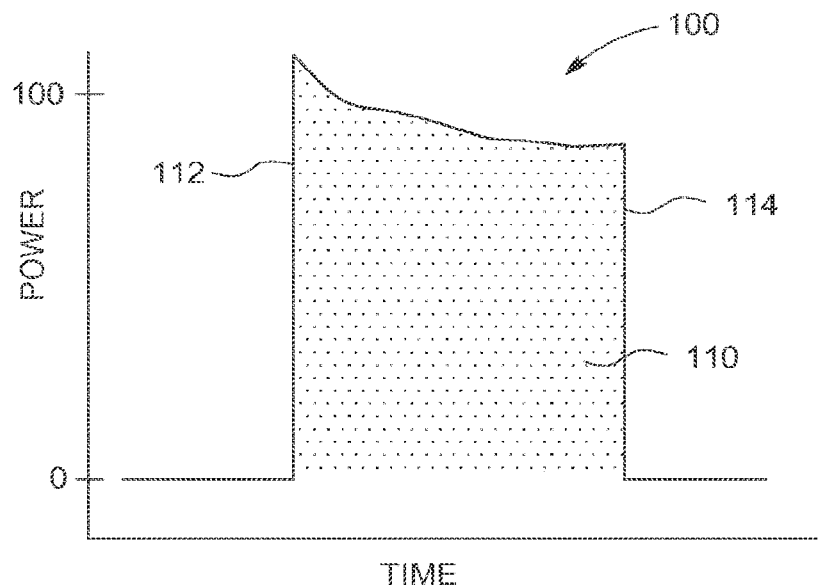
FIG. 2 is a graph illustrating a charge profile during charging of an electric vehicle without the use of a supplemental battery energy storage device.
Figure 3:
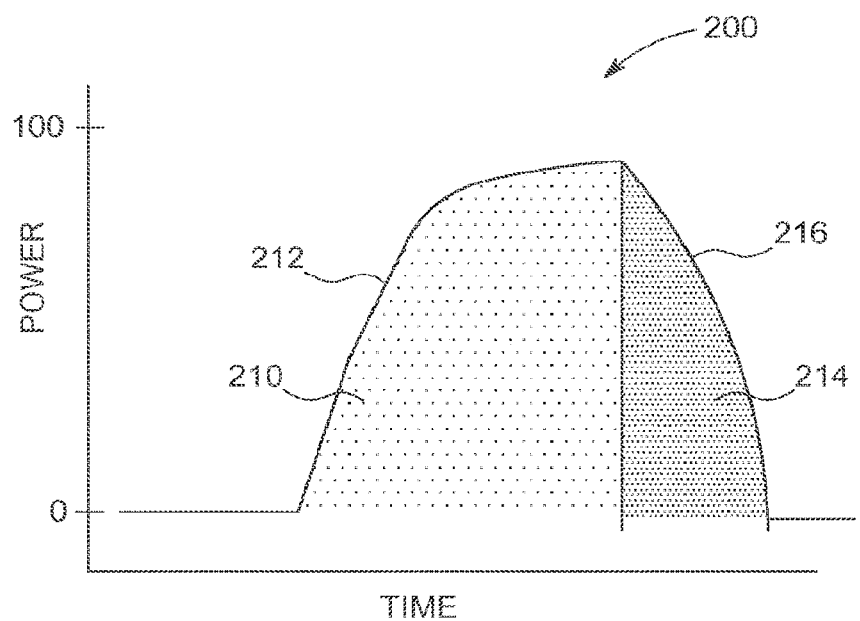
FIG. 3 is a graph illustrating a charge profile during charging of an electric vehicle utilizing the charging station of FIG. 1 having a supplemental battery energy storage device.

With reference to FIGS. 2 and 3, the 'smoothing' effect of the energy storage device 30 is shown. In particular, FIG. 2 is a graph 100 illustrating the power draw on a power distribution grid during charging (represented by area 110 under the charge profile curve) of an electric vehicle utilizing the charging station 10 not having a supplemental battery energy storage device. As illustrated therein, there is a large, instantaneous jump in power draw at the moment 112 charging commences, and a large, instantaneous drop in power draw at the moment 114 charging is finished or terminated. As will be readily appreciated, these large, spikey transient power flows during vehicle/equipment charging increase the stress on upstream electrical grid components and can decrease the integrity of the power distribution system, as a whole.

FIG. 3 is a graph 200 illustrating the smoothing effect of the supplemental energy storage device 30 of embodiments of the charging station 10. Charging of a connected electric vehicle or other piece of machinery of equipment is represented by area 210. As shown therein, the energy storage device 30, by supplying supplemental power in addition to the primary power from the supply line 14, functions to smooth the edges of the charge profile. In particular, when a vehicle is connected to the charging station 10, the on-board energy storage device 30 provides supplemental electrical energy to prevent such a large, instantaneous draw on the power distribution grid, as evidenced by the slope of line 212. Moreover, upon completion of charging, the energy storage device 30 is recharged automatically (represented by area 214), which functions to prevent an instantaneous drop-off in power draw by the charge station 10. As shown therein, recharging the energy storage device 30 upon completion of charging of the electric vehicle functions to smooth the curve at the back end of the charge profile, as evidenced by line 216.

Thus, embodiments of the charging station described herein provide for the tailored and controlled charging of electric vehicles and equipment while minimizing the impact on the larger power grid, such as a power distribution grid within a mine. The station 10 may be a self-contained unit that is low cost to manufacture and/or portable, such that it can be selectively positioned within a mine or other facility. Also, the station may be configured so as to withstand the harsh environment of mines or similar industrial facilities, and may be explosion-proof such that it is rated for use in coal-mining applications. As discussed above, in embodiments the station includes an integrated/on-board energy storage device that helps to smooth the power profile of the charging station, and which helps the upstream electrical grid components handle the large, spikey transient power flows created by the electric vehicles during charging.

Figure 4:
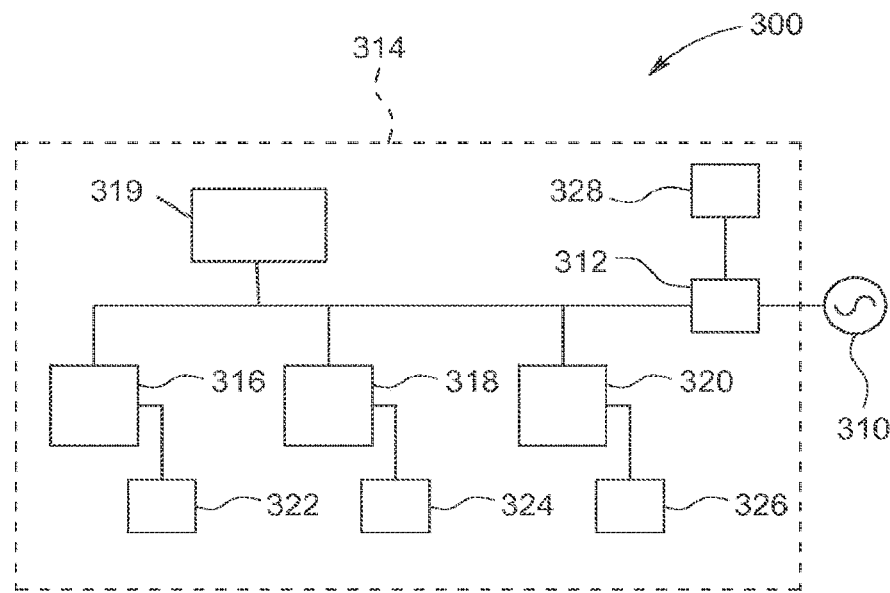
FIG. 4 is a schematic diagram of a system for controlling the active power and reactive power from an energy storage charging station, according to an embodiment of the invention.

FIG. 4 shows an embodiment of a system 300 for controlling active power from one or more charging stations that are electrically connected to a power distribution grid. By controlling the active power from the charging stations, the system 300 is able to provide grid support to the power distribution grid, as discussed hereinafter. While embodiments of the system 300 are described herein as being integrated with a power distribution system within a mine, the system 300 is capable of providing active power support to any type of electrical grid or microgrid for any installation or facility. The system 300, therefore, is not intended to be limited to mining applications, unless otherwise specified.

As shown in FIG. 4, the system 300 includes one or more charging stations 316, 318, 320, and a local power distribution grid 312, which are operably disposed in a mine or other facility 314 where electric machines are operated. The one or more charging stations 316, 318, 320 are electrically connected for the transfer of electrical power to and from the power distribution grid 312. The power distribution grid 312 is electrically connected to a power source 310, which may include, or even comprise exclusively, local power generating equipment (e.g., fuel cells, generators, solar arrays or wind turbines, or the like). Alternatively or additionally, the power source may include a connection to a public utility grid. The power distribution grid 312 may include a network of electrical cables that supply power to the charging stations and to lights, ventilation equipment, mining or other industrial machinery and equipment, and/or other electric machines 319. The charging stations 316, 318, 320 may be selectively connected to rechargeable energy storage devices, such as batteries 322, 324, 326, of electric vehicles or other machinery, in order to selectively recharge the same. As used herein, "selectively connected" means the energy storage devices are not always connected to the charging stations, such that during certain time periods the energy storage devices are placed in electrical connection with charging stations for charging, and during other time periods the energy storage devices are not electrically connected to the charging stations, such as when vehicles in which the energy storage devices are housed are away from the charging stations for vehicle movement. While FIG. 4 illustrates three charging stations, the system 300 may include more or fewer charging stations.

As also shown in FIG. 4, the system 300 further includes a control unit 328 electrically coupled to, and in communication with at least the power distribution grid 312 and/or the charging stations 316, 318, 320. The control unit may also be electrically coupled to, and in communication with, the power source 310 or elements thereof (For example, if the power source includes local generators, the control unit may be electrically coupled to the generators, for receiving operational information of the generators from sensors and/or on-board controllers of the generators.) In an embodiment, the control unit 328 is a centralized control unit that may be located locally within the facility 314, or that may be located remote from the facility 314. As used herein, "centralized" means the control unit is apart from any on-board control unit of the charging stations 316, 318, 320, but that is otherwise configured to communicate with one or more of the charging stations to coordinate operation of the network of charging stations, individually and/or collectively. In other embodiments, the control unit 328 may be housed within one of the charging stations 316, 318, 320. In other embodiments, it is contemplated that the control unit 328 may be a number of coordinated control units, each housed within a respective one of the charging stations 316, 318, 320.

Figure 5:
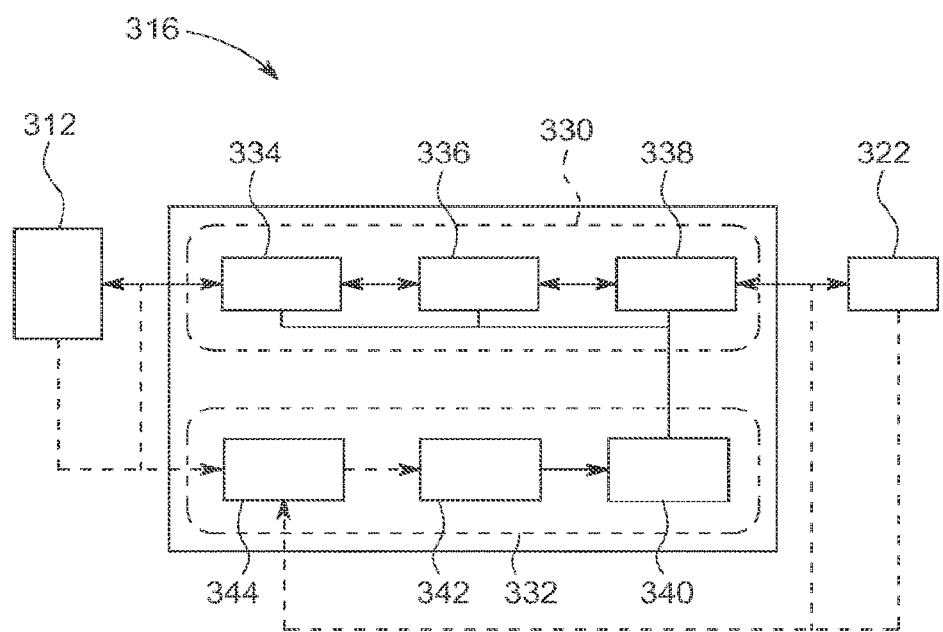
FIG. 5 is a schematic illustration and block diagram of a charging station of the system of FIG. 4, according to an embodiment of the invention.

The charging stations 316, 318, 320 are configured to selectively charge the energy storage devices 322, 324, 326 on-board respective electric vehicles or other machinery (not shown in this view). In other embodiments, the charging stations are additionally or alternatively configured to charge energy storage devices for electric vehicles that are temporarily off-board the vehicles (e.g., the energy storage devices are removed for charging). With reference to FIG. 5, the internal architecture of an exemplary charging station 316 is shown. (The internal architecture of the other charging stations, such as charging station 318, 320, may be substantially identical.) As illustrated therein, the charging station 316 includes a power conversion block 330, which includes power conversion circuitry, and a control block 332 that includes control circuitry. The power conversion block 330 is electrically connected at an input end to the power distribution grid 312 of the mine or other facility 314, and to the electric vehicle battery 322 (when present and connected) at an output end, and includes a converter 334, a driver 336, and a DC/DC converter 338. The control block 332 includes an interface 340, a local control unit 342, and sensing circuitry 344. The control unit 342 is electrically coupled to, and is configured to control, the components of the power conversion block 330 through the interface 340.

As shown in FIG. 5, the sensing circuitry 344 is in communication with, and receives information from or about, the vehicle battery 322 and from the power distribution grid 312, and relays this information to the local control unit 342. In addition, the sensing circuitry 344 monitors the flow of electrical power from the power distribution grid 312 to the charging station 316, as well as to the power distribution grid 312 from the charging station 316, and the flow of electrical power from the charging station 316 to any connected vehicle battery 322, as well as to the charging station 316 from the vehicle battery 322. As will be readily appreciated, all of this information may be communicated to the local control unit 342 and, subsequently, to the control unit 328 in order to provide for overall control of the network of charging stations, as discussed in detail below.

In an embodiment, the charging stations 316, 318, 320 are configured, alternatively or additionally, in whole or in part, like the charging station 10 as described above and illustrated in FIG. 1.

Figure 6:
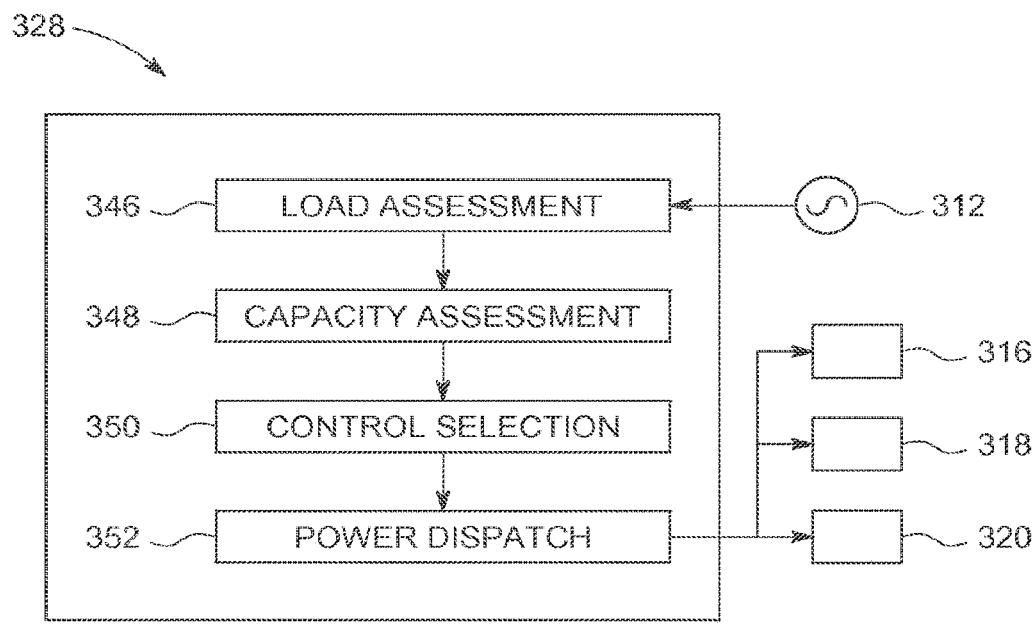
FIG. 6 is a block diagram of a control unit of the system of FIG. 4, illustrating control architecture thereof for providing active power control, according to an embodiment of the invention.

As shown in FIG. 6, in an embodiment, the control unit 328 includes a load assessment block 346, a capacity assessment block 348, a selection block 350, and a dispatch block 352. The control unit 328, through the load assessment block 346, is configured to determine the actual or expected load on the power distribution grid 312 as a result of the starting up, shutting down, and/or continued operation of mining equipment or other electric machines, as well as whether the power supplied by the grid 312 is capable of adequately meeting the load requirements. In particular, in embodiments, the control unit 328 is configured to conduct a real-time load assessment in dependence upon a plurality of load assessment parameters. The load assessment parameters may include one or more of a measured voltage, current, power, and/or frequency of the electrical supply from the distribution grid 312, historical load data, and/or a network model.

In an embodiment, the historical load data and network model may be representative of the number and size of actual and expected electrical loads within the facility and may include data relating to actual and expected inrush currents and step changes during startup and shutdown of electric machines. In an embodiment, historical data may be the instantaneous value of voltage, current, frequency, and power of individual electric machines including, but not limited to, generators or loads, or of aggregated measurements at common measurement points such as feeder heads or junction boxes, or any other point in the power distribution grid.

In embodiments, the control unit 328, through the capacity assessment block 348, is also configured to determine the capacity of the network charging stations 316, 318, 320 to provide active power support to the power distribution grid 312. In particular, the control unit 328 is configured to determine the capacity of the charging stations to provide active power grid support in dependence upon a plurality of capacity assessment parameters/information received from each of the charging stations 316, 318, 320. In an embodiment, the capacity assessment parameters may include information and data relating to the charging profiles of each of the batteries 322, 324, 326 (and their associated electric vehicles) connected to the charging stations 316, 318, 320, respectively, load cycle profiles, asset information, the status of each of the batteries 322, 324, 326, and/or concept of operations for the different electric vehicles.

With further reference to FIG. 6, the control unit 328, in the selection block 350, is configured to select the type of control/grid support to be performed by the system 300 utilizing the charging stations 316, 318, 320, or a combination of active power controls, where feasible. In an embodiment, the type of control/support may include load ramp regulation, generator ramp regulation, and frequency regulation. In addition, the control unit 328 is configured to control the charging stations to provide supplemental reserve power support and/or emergency power support, as discussed in detail below. In an embodiment, certain active power control can be prioritized over others during the control selection depending on the current operating condition or as determined by the operator or another control input.

Moreover, through the power dispatch block 352, the control unit 328 is configured to issue control signals to one or more of the charging stations 316, 318, 320 to provide the particular type of support selected by selection block 350. In an embodiment, the control signals include an active power set point that is communicated to the local control unit 342 of one or more of the charging stations 316, 318, 320.

In operation, in an embodiment, to provide active power support to the power distribution grid, the control unit 328 first conducts a real-time load assessment in dependence upon one or more of voltage, power, frequency, and/or current measurements of the electrical supply from the power source 310 to the power distribution grid 312, historical load data for the grid 312, and a network model. The control unit 328 then determines which charging stations have batteries or other energy storage devices connected to them (and are thus able to provide active power), and the capacity of such charging stations to provide active power in dependence upon the charging profiles of the batteries 322, 324, 326, load cycle profiles, asset information, and the status of each of the batteries 322, 324, 326. Once capacity has been determined, the control unit 328 selects the type of control to be performed, such as load ramp regulation, generator ramp regulation, frequency regulation, providing supplemental reserve power, and/or providing emergency power. Upon selection of the type of control, the control unit 328 communicates control signals that include an active power dispatch command corresponding to the type of control selected to one or more of the charging stations 316, 318, 320, where the command is executed.

In particular, upon receiving the active power command from the control unit 328, the local control unit 342 within the charging station(s) controls the flow of electrical power to provide grid support. Specifically, upon receiving a command from the control unit 328, the local control unit interrupts the charge profile of the connected battery (if the battery is currently being charged) in order to provide active power output (i.e., from the charging station 316 to the power distribution grid 312).

In accordance with the above, the system 300 of the present invention, via the charging stations 316, 318, 320, performs control of active power output from one or more charging stations to a connected electrical grid, such as the power distribution grid 312 within a mine or other facility. As discussed, the active power command is calculated based on the actual type of control to be performed and the total number of energy storage devices connected to the charging stations 316, 318, 320 in the system 300.

In connection with the above, embodiments of the system are configured to provide for load ramp regulation, as well as frequency regulation. With load ramp regulation, the ramp rate of the charging stations is only limited by the size of the energy storage devices connected to the charging stations and their respective states of charge. By controlling the active power output from the charging stations, the charging stations are able to adequately meet the load, thereby allowing the main supply of electricity to a mine or other facility (such as from a main power grid or local power generating sources for a microgrid) to ramp up at less stressful rates. Similarly, turning off a large electric load results in a negative step, causing the main power source to ramp down. In an embodiment, the charging stations can be utilized to prevent such frequent step changes in system loading, thereby extending the operating life of the electric supply equipment.

With respect to generator ramp regulation, whenever there is a change in the load power, the onsite generators would typically modify their output power to match the change. The generators, however, may not be able to meet this change due to factors like current operating point, loss of one or more generators, generator inertia, design limitations, etc. In an embodiment, the control unit 328, to the extent of available capacity of the connected energy storage devices, can augment the generators in meeting these load changes. The control unit 328 can also continuously perform this operation to prevent the generators from constantly changing their output set points, allowing them to be operated more efficiently.

With respect to supplemental reserve power, in order to account for load variability and outage of electric supply equipment (therefore improved reliability), a certain amount of head room is kept on onsite generators and electrical equipment capacities, resulting in reduced efficiency. Such reserves or margins can be reduced by the amount of available capacity of energy storage for the energy storage devices connected to the charging stations.

With respect to emergency power, in an embodiment, in the event of a partial or complete grid outage, the control unit 328 can be used to provide emergency power that can be used for starting up on-site generators and to keep critical loads running.

In certain high power electric machines (e.g., electric machines that include very large electric motors), such as are sometimes found in mines and other industrial facilities, for example, it may be the case that there is a significant portion of regeneration in the machines' duty cycles, resulting in back-feeding of electrical energy from the machinery into the power distribution grid. In an embodiment, the charging stations 316, 318, 320 may be utilized to regulate these back-feeds by absorbing the excessive real power into the connected batteries 322, 324, 326. As will be readily appreciated, by compensating for step changes in the load through the charging/discharging of the batteries 322, 324, 326 connected to the respective charging stations 316, 318, 320, the net effect of these load changes on the utility grid (either local power distribution grid or main supply grid) or microgrid assets is minimized and may be substantially eliminated.

In addition, while frequency regulation is not typically performed for a distribution grid without an isochronous local generation, the charging stations 316, 318, 320 of the system 300 can assist the grid in this operational aspect by charging or discharging the connected batteries 322, 324, 326 in response to the changes in load, thereby regulating the grid frequency and keeping it within acceptable limits. As will be readily appreciated, this also helps in operating local generating equipment more efficiently by allowing them to operate at their optimum point, instead of the less efficient load-following operation mode.

As will be appreciated, in embodiments, the system 300 utilizes the energy storage devices connected to network charging stations for power grid support and, in particular, for frequency support on the grid, as well as to support the ramp rates of mining machinery or other electric machines connected to the grid. As a result, the system 300 minimizes wear and tear on the power generation assets due to steep ramp rates imposed by large step changes that are commonly encountered in a mining power distribution system. By utilizing existing charging stations in mines or other facilities that operate electric vehicles, the existing vulnerabilities of the distribution grid resulting from load variations, step changes, power back-feeding, and the like can be reduced or eliminated.

In an embodiment, it is envisioned that an embodiment of the system may utilize one or a group of network charging stations (and their associated connected batteries or other energy storage devices) to buffer against rapid charging of other energy storage equipment. If necessary, additional batteries can be installed at the charging stations to support this function.

In an embodiment, in addition to active power control, the system 300 may also be configured to provide reactive power to the power distribution grid. In particular, with reference to FIG. 7, the control unit 328 may be additionally configured as shown therein to provide reactive power. In connection with this, the control unit 328 may additionally, or alternatively, include a voltage/reactive power assessment block 354, a reactive capacity assessment block 356, and a dispatch block 358.

In connection with this embodiment, the control unit 328, through the voltage/reactive power assessment block 354, is configured to determine the voltage and/or reactive power present in the distribution lines of the power distribution grid 312 at any given time. In particular, the control unit 328 is configured to conduct a real-time voltage and reactive power assessment for the distribution grid 312 in dependence upon a plurality of reactive power parameters. As used herein, "real time" refers to the monitoring and assessment of distribution system parameters during operation, for any particular moment in time, wherein the assessment has a latency generally within acceptable norms for the electrical system in question, in that any perceptible difference between actual and assessed parameters are minimal and tolerated. In an embodiment, the reactive power parameters may include one or more of a measured voltage, current, and/or power of the electrical supply from the power source 310 to the distribution grid 312 (as well as within the distribution 312), historical data, and a network model. In an embodiment, historical data may be the instantaneous values of voltage, current, frequency, and power of individual electric machines including, but not limited to, generators or loads, or of aggregated measurements at common measurement points such as feeder heads or junction boxes, or any other point in the power distribution network. In an embodiment, the historical data and network model may be representative of the number and size of actual and expected electrical loads within the mine (or other facility or other location), and may include data relating to the actual and expected voltages across the distribution cables and/or actual and anticipated voltage fluctuations. In another embodiment, the historical data, by itself or in combination with the network model, can be used to forecast future operating conditions that are taken into account for determining the reactive power dispatch.

The control unit 328, through the capacity assessment block 356, is also configured to determine the capacity of the network charging stations 316, 318, 320 to provide reactive power support to the power distribution network 312. (Reactive power support may include providing reactive power and/or receiving/absorbing reactive power.) In particular, the control unit 328 is configured to determine the capacity of the charging stations to provide reactive power support in dependence upon a plurality of reactive capacity assessment parameters and/or information received from each of the charging stations 316, 318, 320. In an embodiment, the reactive capacity assessment parameters may include information and data relating to the charging profiles of each of the batteries 322, 324, 326 (and their associated electric vehicles) connected to the charging stations 316, 318, 320, respectively, load cycle profiles, and generating equipment and power supply asset information.

Figure 7:
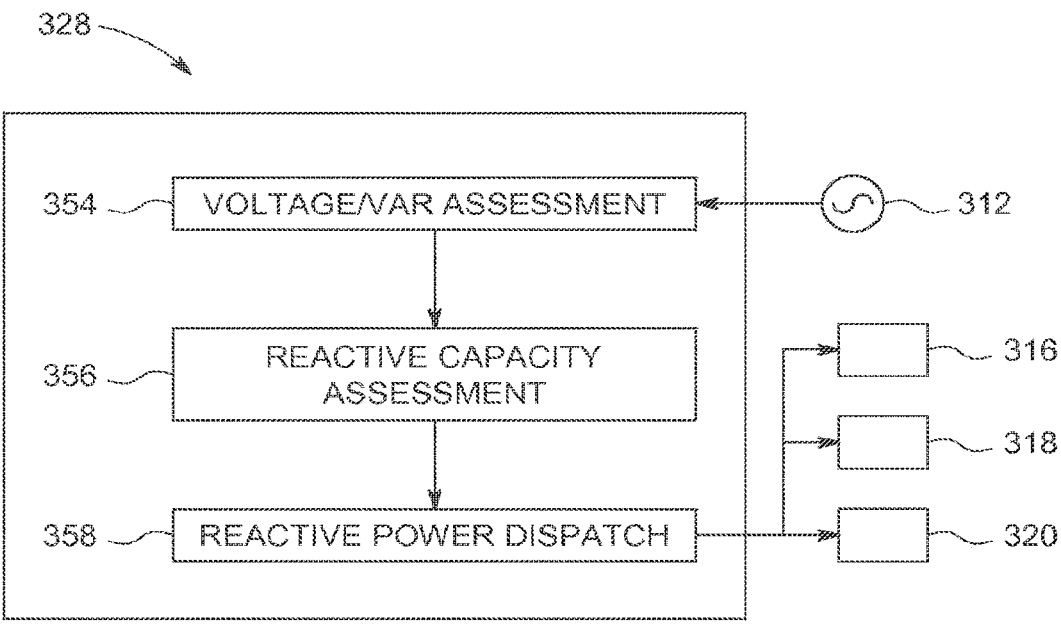
FIG. 7 is a block diagram of the control unit of the system of FIG. 4, illustrating additional control architecture thereof for providing reactive power, according to an embodiment of the invention.

With further reference to FIG. 7, the control unit 328, through the reactive power dispatch block 358, is configured to issue control signals to one or more of the charging stations 316, 318, 320 to provide reactive power support. In an embodiment, the control signals include a reactive power set point that is communicated to the local control unit(s) 342 of one or more of the charging stations 316, 318, 320. In an embodiment, the reactive power set point corresponds to, or is otherwise calculated in dependence upon, a desired terminal voltage on the power distribution grid 312. As will be readily appreciated, it is not required that a battery be connected to the charging stations 316, 318, 320 in order for the stations to provide reactive power to the power distribution network.

In operation, in order to provide reactive power to the power distribution grid, the control unit 328 first conducts a real-time reactive power assessment for the power distribution grid 312 in dependence upon one or more of voltage, power, and/or current measurements of the electrical supply from the power source 310 to the distribution grid 312, historical load data for the network 312, and a network model. The control unit 328 then determines the capacity of the network charging stations 316, 318, 320 to provide reactive power in dependence upon the charging profiles of any connected batteries 322, 324, 326, load cycle profiles, and generation asset information. Once capacity has been determined, the control unit 328 issues control signals that include a reactive power dispatch command corresponding to the amount of reactive power needed to one or more of the network charging stations 316, 318, 320, where the command is executed. In an embodiment, the reactive power command is calculated in dependence upon one of a measurement at the point of load, anticipated reactive power demand, increased load demand, and/or power factor improvement for a generator. In an embodiment, the measurement may be a voltage measurement, but the present invention is not intended to be so limited in this regard and may include any other type of measurement such as a power, current, or frequency measurement.

Upon receiving the reactive power command from the control unit 328 (centralized or otherwise), the local control unit(s) 342 within the charging station(s) controls the flow of reactive power from the charging stations to the distribution grid 312 and, ultimately, to any electric machinery connected to the grid 312. Specifically, upon receiving a command from the control unit 328, the local control unit 342 initiates reactive power output from the charging station(s) in accordance with the determined set-point in order to optimize or otherwise control the reactive power flow to the electric machines.

In accordance with the above, the system 300, via the charging stations 316, 318, 320, may be configured to perform voltage control through control of reactive power output from one or more charging stations to a connected electrical grid, such as the power distribution system 312 within a mine or other facility. As discussed, in embodiments, the reactive power command of the control unit 328 is calculated based on a desired terminal voltage on the power distribution grid 312.

Additionally, the system 300 of the present invention, via the charging stations, may be configured to provide for voltage/reactive power management in order to optimize the reactive power (i.e., VAR) to the electrical mining machinery (or other electric machinery) within the mine (or other location). In an embodiment, irrespective of whether a battery is connected to the charging stations or not, the charging stations can assist in voltage regulation by absorbing or supplying reactive power as necessary. As will be readily appreciated, the amount of reactive power each charging station can supply is only limited by the size of the converter (e.g., inverter) within the charging station. In addition to regulating voltage at the point of load, in an embodiment, the charging stations can also be utilized to compensate for voltage sags caused by step changes in load as electrical loads are turned on and off.

By maintaining minimum acceptable voltages at the point of load by supplying reactive power from the charging stations, motor productivity and life may be extended beyond what is capable with existing systems. By extending motor life, the life and productivity of the machinery, as a whole, may be increased. In addition, by maintaining adequate voltage for the electric mining machinery operating within a mine or other facility, the physical extent of the mine or other facility may be expanded in excess of what has heretofore been possible (as power can be delivered further than has heretofore been possible as a result of the supplement of reactive power from the charging stations). Advantageously, the system of embodiments of the invention utilizes energy storage charging stations that may already be present in mine installations or other facilities (for mines or other facilities that operate electric vehicles), obviating the need to install any additional systems or hardware.

While the control unit 328 of the system 300 has been described above as containing the control architecture illustrated in both FIGS. 6 and 7 for selectively providing both active power control and reactive power, in certain embodiments, the control unit 328 may have either the architecture illustrated in FIG. 6 for providing active power control, or the architecture in FIG. 7 for providing reactive power. In other embodiments, the system may have separate control units for providing active power and reactive power control, respectively.

Figure 8:
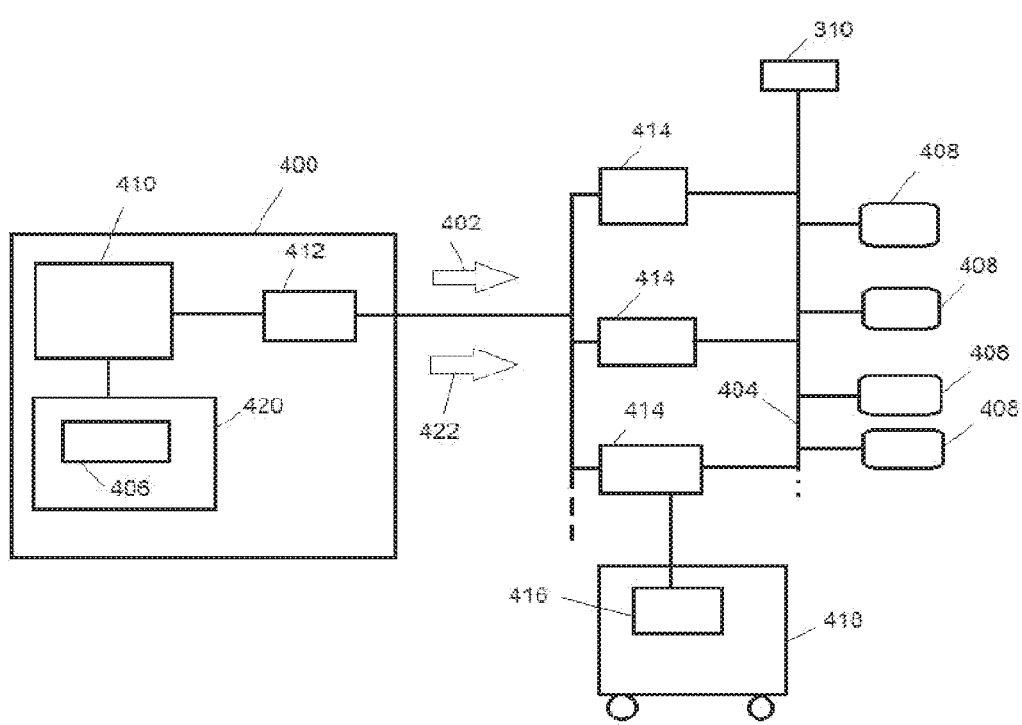
FIG. 8 is a block diagram of another embodiment of a control unit and system.

Alternatively or additionally to controlling charging stations based on real-time load assessments, in embodiments, with reference to FIG. 8, a control unit 400 is configured to generate control signals 402 for active and/or reactive power support of a power distribution grid 404, based on a load cycle profile 406 of one or more electric machines 408 electrically coupled to the power distribution grid. The control unit includes one or more processors 410 and a communication interface 412 operably coupled to the processor. The communication interface is configured to communicate with one or more charging stations 414 electrically coupled to receive electrical power from a power distribution grid. The charging stations are configured to selectively charge one or more energy storage devices 416 connected to the one or more charging stations. For example, the energy storage devices may be batteries that are disposed in, or configured to be disposed in, electric vehicles 418. The load cycle profile 406 may be stored in a memory unit 420 associated with the processor. The control unit 400 may additionally or alternatively include components such as shown in and described in connection with FIGS. 1, 6, and 7.

In an embodiment, the load cycle profile 406 includes first information of one or more times (time of day, and/or time period or duration) when the one or more electric machines are scheduled to draw electrical power from the power distribution grid and one or more magnitudes of the electrical power to be drawn by the one or more electric machines from the power distribution grid at the one or more times. For example, the load cycle profile may indicate that a first electric machine is scheduled to commence operation at a given time of day, to draw 10 megawatts of power for a transient time period, and then draw 1 megawatt for a steady state operational time period. Other electric machines may be similarly characterized in the load cycle profile. Based at least in part on this information (e.g., real-time load assessment data may also be factored in), the processor 410 of the control unit 400 is configured to generate the first control signals 402 for communication by the communication interface to the one or more charging stations to control transfer of at least one of reactive power or active power from the one or more charging stations to the power distribution grid 404. For example, for a given time of day and expected power magnitude and duration, the control unit may generate the control signals to control the charging stations, ahead of the time, to suspend electric vehicle charging operations (including possibly controlling or scheduling the vehicles not to detach from the charging stations) and, at the given time of day, commence with transferring power to the grid for all or part of the duration. (It may be the case, for example, that the control unit controls the charging stations to transfer power to the power distribution grid only for power draw transients that exceed a designated threshold, and not for steady state operations that can be stably accommodated by the power supply.)

In embodiments, the electric machines 408 are not charging stations, that is, they are not configured to process electrical power for charging the energy storage devices of electric vehicles or other machines. This reflects that the control unit 400 is configured to control grid support not only in situations where charging stations and similar relatively small/stable loads are connected to the grid, but also in situations where relatively large, discrete electric machines, with large power draws and transients (e.g., for a given machine, 1 megawatts to 10 megawatts or more), are connected to the grid, such as may be the case in a mine or other industrial facility.

As noted, in certain operational modes, such electric machines may feed/transfer power back to the power distribution grid 404. Accordingly, in embodiments, additionally or alternatively, the load cycle profile 406 may include second information of one or more second times (e.g., time of day, and/or time periods or durations) when the one or more electric machines 408 are scheduled to transfer electrical power back to the power distribution grid and one or more magnitudes of the electrical power to be transferred back to the power distribution grid by the one or more electric machines at the one or more second times. The processor 410 of the control unit 400 is further configured to generate second control signals 422, based at least in part on the second information, for communication by the communication interface 412 to the one or more charging stations to control the one or more charging stations to charge the one or more energy storage devices 416 with electrical power drawn from the power distribution grid. For example, the control unit 400 may delay or schedule charging by the charging stations until a time when the electric machines 408 are expected/scheduled to feed power back to the grid.

In other embodiments, alternatively or additionally, the load cycle profile 406 includes information of how much power the one or more electric machines 408 are expected to draw from (or transfer back to) the power distribution grid when the one or more electric machines are operational. This may account for situations where it is unknown when an electric machine will commence operation. In particular, the control unit may be configured to detect or determine when an electric machine has become operational, or will become operational. This may be based on sensor data (e.g., generated by sensors operably associated with the electric machine), and/or on measurements of electrical signals present on grid supply lines connecting to the electric machine. For example, if an electrical signal on a grid supply line transitions from zero current to some non-zero current, this may be indicative of an electric machine commencing operation. Alternatively or additionally, the control unit may receive information that an electric machine has commenced operation, or will commence operation, such as from a controller that is on-board the electric machine. (For example, if machine operation is contingent upon the occurrence of certain events or conditions, the controller, upon determining that such events or conditions have occurred, may communicate with the control unit in addition to controlling the machine to commence operation.) In operation, the control unit will know from the load cycle profile how much power is expected to be drawn from the grid (or fed back to the grid) when a given machine is operational (i.e., expected power draw or feedback as a function of operating time), allowing the control unit to react accordingly, responsive to detecting that the machine has become or will become operational, or receiving information of the same. For example, for a given machine, if the load cycle profile indicates that upon commencing operation the machine will draw 1 megawatt for a given transient time period, when the control unit determines (or receives information) that the machine is commencing operation, the control unit generates the control signals 402 to control the charging stations 414 to transfer power from energy storage devices 416 coupled to the charging stations to the power distribution grid 404. The same is true for generating control signals 422 to support power transfer from the electric machines back to the power distribution grid. For example, if the load cycle profile indicates that upon commencing operation a given machine will operate for a given time period and then transfer 1 megawatt of power back to the grid upon shutting off at the end of the time period, when the control unit determines (or receives information) that the machine is commencing operation, the control unit sets a counter for the time period, and generates the control signals 422 to control the charging stations to commence energy storage device charging when, or ahead of when, the electric machine will transfer the power back to the grid.

In embodiments, the control unit is communicatively coupled with charging stations and/or electric machines by way of an Ethernet network or other local area data network.

Although embodiments are set forth herein characterizing control based on load cycle profiles of machines that draw electrical power in the order of from 1 to 10 megawatts each, this does not preclude load cycle profiles that additionally take into account loads less than this amount (i.e., loads both above and below 1 megawatt), or load cycle profiles that take into account only loads less than 1 megawatt. In some embodiments, at least some of the loads (machines) are 1 megawatt or more.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The terms "including" and "in which" are used as the plain-English equivalents of the respective terms "comprising" and "wherein." Moreover, the terms "first," "second," "third," "upper," "lower," "bottom," "top," etc. are used merely as labels, and are not intended to impose numerical or positional requirements on their objects.

This written description uses examples to disclose several embodiments of the invention, including the best mode, and also to enable one of ordinary skill in the art to practice the embodiments of invention, including making and using any devices or systems and performing any incorporated methods.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
   a control unit comprising one or more processors and a communication interface operably coupled to the one or more processors, wherein the communication interface is configured to communicate with one or more charging stations electrically coupled to receive electrical power from a power distribution grid and configured to selectively charge one or more energy storage devices that are included in the one or more charging stations,
   wherein the one or more processors of the control unit are configured to generate control signals for communication by the communication interface to the one or more charging stations to control transfer of electric power from the one or more charging stations to the power distribution grid based at least in part on one or more scheduled times that one or more electric machines are to draw the electric power from the power distribution grid via the one or more charging stations and one or more draw magnitudes that the one or more electric machines are scheduled to draw the electric power from the power distribution grid via the one or more charging stations.

2. The system of claim 1, wherein the one or more electric machines are discrete electric machines other than charging stations.

3. The system of claim 1, wherein the one or more processors of the control unit are configured to generate the control signals based also on one or more transfer times that the one or more electric machines are scheduled to transfer the electrical power back to the power distribution grid and one or more transfer magnitudes of the electrical power to be transferred back to the power distribution grid.

4. The system of claim 3, wherein the one or more electric machines are discrete electric machines other than charging stations.

5. The system of claim 4, wherein each of the one or more draw magnitudes and each of the one or more transfer magnitudes is at least one megawatt.

6. The system of claim 5, wherein the power distribution grid is disposed in a mine, the one or more energy storage devices are configured for deployment in electric mine vehicles for providing on-board electrical power at least for vehicle propulsion, and the electric machines comprise mining equipment other than the electric mine vehicles.

7. The system of claim 1, wherein the one or more processors of the control unit are configured to:
   conduct a real-time load assessment of the power distribution grid based on at least one of a voltage measurement or a current measurement of the electrical power associated with the power distribution grid; and
   generate the control signals further based on the load assessment.

8. The system of claim 7, wherein the one or more processors of the control unit are configured to:
   determine a capacity of the one or more charging stations to transfer the electric power to the power distribution grid based at least in part on one or more charging profiles of the energy storage devices; and
   generate the control signals further based on the capacity that is determined.

9. The system of claim 1, wherein the control unit is housed within one of the one or more charging stations.

10. The system of claim 1, wherein:
    the one or more charging stations include a plurality of charging stations; and
    the control unit is a centralized control unit remotely located from the plurality of charging stations.

11. The system of claim 10, wherein each charging station includes a respective local control unit configured to receive the control signals from the centralized control unit and to transfer the electric power to the power distribution grid based at least in part on the control signals.

12. A method comprising:
    with one or more processors of a control unit, generating control signals for controlling transfer of electric power from one or more charging stations to a power distribution grid that is electrically coupled to the one or more charging stations, the one or more charging stations configured to selectively charge one or more energy storage devices that are included in the one or more charging stations, wherein the control signals are generated based at least in part on one or more scheduled times that one or more electric machines are to draw the electric power from the power distribution grid via the one or more charging stations and one or more draw magnitudes that the one or more electric machines are scheduled to draw the electric power from the power distribution grid via the one or more charging stations; and
    with a communication interface of the control unit that is operably coupled to the one or more processors, communicating the control signals to the one or more charging stations.

13. The method of claim 12, wherein the one or more electric machines are discrete electric machines other than charging stations.

14. The method of claim 12, wherein each of the one or more draw magnitudes is at least one megawatt.

15. The method of claim 12, wherein the control signals are generated based also on one or more transfer times that the one or more electric machines are scheduled to transfer the electrical power back to the power distribution grid and one or more transfer magnitudes of the electrical power to be transferred back to the power distribution grid by the one or more electric machines at the one or more transfer times.

16. The method of claim 12, wherein the control signals are generated based on how much of the electric power that the one or more electric machines are expected to draw from the power distribution grid when the one or more electric machines are operational.

17. The method of claim 12, further comprising:
transferring the electric power from the one or more charging stations to the power distribution grid according to the control signals.

18. The method of claim 17, further comprising:
re-charging the one or more energy storage devices by transferring supplemental electric energy according to the control signals from the power distribution grid to the one or more energy storage devices after completion of charging the one or more electric machines from the power distribution grid.

* * * * *